(12) United States Patent
Chandrashekar et al.

(10) Patent No.: US 12,464,426 B2
(45) Date of Patent: Nov. 4, 2025

(54) APPARATUS COMPRISING AT LEAST ONE PROCESSOR

(71) Applicant: Nokia Technologies Oy, Espoo (FI)

(72) Inventors: Subramanya Chandrashekar, Bangalore (IN); Krzysztof Kordybach, Wroclaw (PL); Ahmad Awada, Munich (DE)

(73) Assignee: Nokia Technologies Oy, Espoo (FI)

( * ) Notice: Subject to any disclaimer, the term of this patent is extended or adjusted under 35 U.S.C. 154(b) by 359 days.

(21) Appl. No.: 18/044,466

(22) PCT Filed: Sep. 17, 2021

(86) PCT No.: PCT/EP2021/075662
§ 371 (c)(1),
(2) Date: Mar. 8, 2023

(87) PCT Pub. No.: WO2022/078710
PCT Pub. Date: Apr. 21, 2022

(65) Prior Publication Data
US 2023/0328600 A1    Oct. 12, 2023

(30) Foreign Application Priority Data
Oct. 13, 2020   (EP) .................................... 20201605

(51) Int. Cl.
*H04W 36/08*   (2009.01)
*H04W 36/00*   (2009.01)

(52) U.S. Cl.
CPC ...... *H04W 36/08* (2013.01); *H04W 36/00698* (2023.05)

(58) Field of Classification Search
CPC .......... H04W 36/08; H04W 36/00698; H04W 76/15; H04W 36/0061; H04W 76/34; H04W 92/02
See application file for complete search history.

(56) References Cited

U.S. PATENT DOCUMENTS

2016/0050607 A1*   2/2016   Gao ................... H04W 36/302
                                                    370/252
2019/0261235 A1    8/2019   Yilmaz et al.
(Continued)

FOREIGN PATENT DOCUMENTS

EP          3589069 A1      1/2020
WO    2019/240770 A1     12/2019
(Continued)

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.2.0, Jul. 2020, pp. 1-148.

(Continued)

*Primary Examiner* — Kibrom T Hailu
(74) *Attorney, Agent, or Firm* — Nokia Technologies Oy

(57) ABSTRACT

An apparatus, comprising at least one processor, and at least one memory storing instructions, the at least one memory and the instructions configured to, with the at least one processor, cause a serving secondary node to transmit to a target secondary node a preparation request indicating that an inter-secondary node conditional PSCell change is to be prepared.

8 Claims, 5 Drawing Sheets

(56) References Cited

U.S. PATENT DOCUMENTS

| | | | |
|---|---|---|---|
| 2020/0008113 A1 | 1/2020 | Chen | |
| 2020/0260325 A1* | 8/2020 | Futaki | H04W 28/0967 |
| 2020/0389823 A1 | 12/2020 | Xu et al. | |
| 2022/0256426 A1* | 8/2022 | Kim | H04W 36/362 |
| 2022/0369172 A1* | 11/2022 | Hwang | H04W 36/0079 |

FOREIGN PATENT DOCUMENTS

| | | |
|---|---|---|
| WO | 2020/091662 A1 | 5/2020 |
| WO | 2020/144917 A1 | 7/2020 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.2.0, Jul. 2020, pp. 1-390.

"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340, V16.2.0, Jul. 2020, pp. 1-78.

"Report on Email Discussion [107b#52][NR MobE] Open Issues Conditional PSCell Addition/Change (CATT)", 3GPP TSG-RAN WG2 Meeting #108, R2-1916300, Agenda: 6.9.4, CATT, Nov. 18-22, 2019, 46 pages.

"Report on Offline Discussion [108] agreeable proposals on Conditional PSCell Addition/Change (CATT)", 3GPP TSG-RAN WG2 Meeting #108, R2-191xxxx, Agenda: 6.9.4, CATT, Nov. 18-22, 2019, 12 pages.

"CPC with SRB3 Configuration", 3GPP TSG-RAN WG2 Meeting #109bis-e, R2-2002800, Agenda: 6.9.4.1, Apple, Apr. 20-30, 2020, 1 page.

Extended European Search Report received for corresponding European Patent Application No. 20201605.1, dated Mar. 29, 2021, 12 pages.

"Conditional SN Change/Addition", 3GPP TSG-RAN WG3 #106, R3-196796, Agenda: 15.3.1.1, Qualcomm Incorporated, Nov. 18-22, 2019, 2 pages.

"Discussion on Conditional PSCell addition/change", 3GPP TSG-RAN WG2#111-e, R2-2007679, Agenda: 8.2.2, Huawei, Aug. 17-28, 2020, 7 pages.

International Search Report and Written Opinion received for corresponding Patent Cooperation Treaty Application No. PCT/EP2021/075662, dated Dec. 23, 2021, 14 pages.

Office action received for corresponding European Patent Application No. 20201605.1, dated Mar. 18, 2024, 6 pages.

* cited by examiner

APPARATUS COMPRISING AT LEAST ONE PROCESSOR

RELATED APPLICATION

This application was originally filed as PCT Application No. PCT/EP2021/075662, filed on Sep. 17, 2021, which claims priority from EP Application Serial No. 20201605.1, filed on Oct. 13, 2020, each of which is incorporated herein by reference in its entirety.

FIELD OF THE DISCLOSURE

Various example embodiments relate to an apparatus comprising at least one processor.

Further embodiments relate to a method of operating related to such apparatus.

BACKGROUND

Wireless communications systems may e.g. be used for wireless exchange of information between two or more entities, e.g. comprising one or more terminal devices, e.g. user equipment, and one or more network devices such as e.g. base stations.

Some terminal devices are capable of Multi-Radio Dual Connectivity (MR-DC), which is a Dual Connectivity between E-UTRA (Evolved Universal Terrestrial Radio Access) and (5G) NR (New Radio) nodes, or between two NR nodes. MR-DC is possible with both EPC (Evolved Packet Core) and SGC. Four variants of MR-DC are: EN-DC, NGEN-DC, NE-DC and NR-DC.

Regarding MR-DC with EPC, E-UTRAN supports MR-DC via E-UTRA-NR Dual Connectivity (EN-DC), in which a user equipment (UE) may be connected to one eNB (eNodeB) that acts as a master node (MN) and to one en-gNB that acts as a secondary node (SN).

SUMMARY

Various embodiments of the disclosure are set out by the independent claims. The exemplary embodiments and features, if any, described in this specification, that do not fall under the scope of the independent claims, are to be interpreted as examples useful for understanding various exemplary embodiments of the disclosure.

Some embodiments relate to an apparatus, comprising at least one processor, and at least one memory storing instructions, the at least one memory and the instructions configured to, with the at least one processor, cause a serving secondary node to transmit to a target secondary node a preparation request indicating that an inter-secondary node conditional PSCell (primary cell of a secondary cell group, SCG) change is to be prepared.

In some embodiments, the apparatus may be an apparatus for a wireless communications system.

In some embodiments, the apparatus or its functionality, respectively, may be provided for and/or in a network element of the communications system, for example in a base station, e.g. a gNodeB (gNB), wherein the gNB may e.g. at least temporarily be operated as a serving secondary node.

In some embodiments, the apparatus according to the embodiments or its functionality, respectively, may be used for or within wireless communications systems, e.g. networks, based on or at least partially adhering to third generation partnership project, 3GPP, radio standards such as 5G (fifth generation) or other radio access technology.

In some embodiments, the apparatus according to the embodiments may be used with terminal devices capable of Multi-Radio Dual Connectivity (MR-DC), e.g. Dual Connectivity between E-UTRA (Evolved Universal Terrestrial Radio Access) and (5G) NR (New Radio) nodes, or between two NR nodes, e.g. EN-DC and/or NR-DC.

Regarding MR-DC with EPC, E-UTRAN supports MR-DC via E-UTRA-NR Dual Connectivity (EN-DC), in which a user equipment (UE) may be connected to one eNB (eNodeB) that acts as a master node (MN) and to one en-gNB that acts as a secondary node (SN).

In some embodiments, the apparatus according to the embodiments may be used for preparing a conditional PSCell change, CPC, e.g. inter-SN CPC, e.g. for preparing a PSCell belonging to a neighbor gNB, wherein e.g. a user equipment performs a PSCell change when a predetermined condition is met for a specific target PSCell.

In some embodiments, the instructions, when executed by the at least one processor, cause the serving secondary node to receive a preparation response from the target secondary node, e.g. based on and/or in response to the preparation request.

In some embodiments, the preparation response may comprise one or more (conditional) reconfigurations associated with one or more potential target PSCells, which potential target PSCells are e.g. controlled by the target secondary node.

In some embodiments, the instructions, when executed by the at least one processor, cause the serving secondary node to at least temporarily directly transmit the preparation request to the target secondary node and/or to directly receive the preparation response from the target secondary node, e.g. via a direct signaling connection between the serving secondary node and the target secondary node.

In some embodiments, the direct data connection between the serving secondary node and the target secondary node may comprise an Xn interface.

In some embodiments, the instructions, when executed by the at least one processor, cause the serving secondary node to at least temporarily transmit the preparation request to the target secondary node via a master node, e.g. of the MR-DC, and/or to receive the preparation response from the target secondary node via the master node. In other words, in some embodiments, the preparation request and/or the preparation response are at least temporarily transmitted via the master node, e.g. from the serving secondary node to the master node, and from the master node to the target secondary node (e.g., for the preparation request), and/or from the target secondary node to the master node, and from the master node to the serving secondary node (e.g., for the preparation response). In some embodiments, the preparation request is kept transparent to the master node.

In some embodiments, the instructions, when executed by the at least one processor, cause the serving secondary node to determine, whether the serving secondary node may directly transmit the preparation request to the target secondary node, e.g. via the Xn interface, as exemplarily mentioned above. As an example, in some embodiments, such information may be signaled by another device, e.g. a master node, to the serving secondary node.

In some embodiments, the instructions, when executed by the at least one processor, cause the serving secondary node to receive a first information from a master node, the first information indicating whether the serving secondary node may directly transmit the preparation request to the target secondary node, e.g. via the Xn interface. In some embodiments, based on the first information, the serving secondary node may determine whether it may directly transmit the preparation request to the target secondary node, e.g. via the Xn interface. However, in some embodiments, wherein e.g. the master node signals to the serving secondary node that the serving secondary node may not transmit the preparation request to the target secondary node directly, the serving secondary node may e.g. act accordingly, e.g. by transmitting the preparation request via the master node, as also exemplarily disclosed above.

In other words, in some embodiments, the master node may signal to the serving secondary node, e.g. using the first information, if the master node agrees for the serving secondary node to prepare the inter-SN neighbors directly, e.g. via directly transmitting one or more preparation requests to the one or more target secondary nodes.

In some embodiments, the preparation request may also be denoted as "Inter-SN PSCell Preparation Request". In some embodiments, the preparation response may also be denoted as "Inter-SN PSCell Preparation Response".

In some embodiments, the serving secondary node may prepare one or more PSCells, e.g. by transmitting and/or routing the (Inter-SN PSCell) preparation request via the master node ("indirect" variant) or directly ("direct" variant), e.g. over Xn.

In some embodiments, e.g. if a target secondary node has multiple PSCells, a single (Inter-SN PSCell) preparation request may be used to prepare a plurality, e.g. all, of the PSCells, e.g. simultaneously.

In some embodiments, e.g. if different PSCells belong to different target secondary nodes, respective different preparation requests have to be used. In these cases, too, at least some of the different preparation requests may e.g. be transmitted directly to respective first target secondary nodes, e.g. via an Xn interface, and at least some further ones of the different preparation requests may e.g. be transmitted to respective second target secondary nodes via the master node.

In some embodiments, e.g. for transmitting the preparation request via the master node and/or for receiving the preparation response via the master node, a data container, e.g. "transparent" data container may be used. In some embodiments, the data container is not decoded by the master node, but e.g. rather merely forwarded to the intended receiver, e.g. at least one target secondary node in case of the preparation request and/or the serving secondary node in case of the preparation response.

In some embodiments, the instructions, when executed by the at least one processor, cause the serving secondary node to transmit configuration information related to the inter-secondary node conditional PSCell change to a user equipment, e.g. upon receipt of a corresponding preparation response.

In some embodiments, the instructions, when executed by the at least one processor, cause the serving secondary node to transmit the configuration information related to the inter-secondary node conditional PSCell change to a user equipment over the signaling radio bearer that is using the radio interface of the serving secondary node.

In some embodiments, the configuration information may comprise reconfigurations associated with a respective PSCell, which e.g. enable the user equipment to perform the conditional PSCell change, e.g. once the corresponding criteria are satisfied.

In some embodiments, a radio resource control, RRC, Reconfiguration message may be used for transmitting the configuration information related to the inter-secondary node conditional PSCell change to the user equipment.

In some embodiments, the configuration information may be transmitted to the user equipment via a signaling radio bearer (SRB), e.g. SRB3, e.g. without involvement of the master node, e.g. this is valid when there is no security key re-generation dependency on the master node.

Some embodiments relate to an apparatus, comprising at least one processor, and at least one memory storing instructions, the at least one memory and the instructions configured to, with the at least one processor, cause a target secondary node to receive from a serving secondary node a preparation request indicating that an inter-secondary node conditional PSCell change is to be prepared, and to transmit to the serving secondary node a preparation response.

In some embodiments, the target secondary node may directly receive the preparation request from a serving secondary node, e.g. via an Xn interface.

In some embodiments, the target secondary node may directly transmit the preparation response to the serving secondary node, e.g. via the Xn interface.

In some embodiments, the target secondary node may receive the preparation request from a serving secondary node via the master node, wherein e.g. the master node forwards the preparation request as received from the serving secondary node, e.g. in the form of a ("transparent") data container, which e.g. is not decoded by the master node.

In some embodiments, the target secondary node may transmit the preparation response to the serving secondary node via the master node, wherein e.g. the master node forwards the preparation response as received from the target secondary node, e.g. in the form of a ("transparent") data container, which e.g. is not decoded by the master node.

In some embodiments, the instructions, when executed by the at least one processor, cause the target secondary node to transmit a release request to the serving secondary node, e.g. after a random access channel (RACH) procedure of a user equipment with the target secondary node.

Some embodiments relate to an apparatus, comprising at least one processor, and at least one memory storing instructions, the at least one memory and the instructions configured to, with the at least one processor, cause a master node to transmit to a serving secondary node first information indicating whether the serving secondary node may directly transmit a preparation request indicating that an inter-secondary node conditional PSCell change is to be prepared to a target secondary node.

In some embodiments, the first information may be transmitted from the master node to the serving secondary node using an X2 interface. In some embodiments, the first information may e.g. be included in at least one message, e.g. associated with a secondary node addition procedure.

In some embodiments, the first information may e.g. be represented by a flag, e.g. a bit flag, e.g. comprising a single bit.

Some embodiments relate to an apparatus, comprising at least one processor, and at least one memory storing instructions, the at least one memory and the instructions configured to, with the at least one processor, cause a master node to receive the preparation request from the serving secondary node and forward it to a target secondary node, wherein the preparation request may e.g. comprise the form of a ("transparent") data container.

In some embodiments, the preparation request and/or the data container comprising the preparation request is not decoded by the master node. Instead, in some embodiments, the preparation request and/or the data container comprising the preparation request may be forwarded by the master node, e.g. without decoding by the master node.

Some embodiments relate to an apparatus, comprising at least one processor, and at least one memory storing instructions, the at least one memory and the instructions configured to, with the at least one processor, cause a master node to receive the preparation response from the target secondary node and forward it to the serving secondary node, wherein the preparation response may e.g. comprise the form of a ("transparent") data container.

In some embodiments, the preparation response and/or the data container comprising the preparation response is not decoded by the master node. Instead, in some embodiments, the preparation response and/or the data container comprising the preparation response may be forwarded by the master node, e.g. without decoding by the master node.

Some embodiments relate to a method comprising: transmitting, by a serving secondary node, to a target secondary node a preparation request indicating that an inter-secondary node conditional PSCell change is to be prepared.

Further exemplary embodiments of the method relate to method aspects that have exemplarily be explained above with respect to the serving secondary node.

Some embodiments relate to a method comprising: receiving, by a target secondary node, from a serving secondary node a preparation request indicating that an inter-secondary node conditional PSCell change is to be prepared, and transmitting, by the target secondary node, to the serving secondary node a preparation response.

Further exemplary embodiments of the method relate to method aspects that have exemplarily be explained above with respect to the target secondary node.

Some embodiments relate to a method comprising at least one of the following steps: a) transmitting, by a master node, to a serving secondary node first information indicating whether the serving secondary node may directly transmit a preparation request indicating that an inter-secondary node conditional PSCell change is to be prepared to a target secondary node, b) receiving, by the master node, the preparation request from the serving secondary node, and forwarding it to a target secondary node, c) receiving, by the master node, the preparation response from the target secondary node and forwarding it to the serving secondary node.

Further exemplary embodiments of the method relate to method aspects that have exemplarily be explained above with respect to the master node.

In some embodiments, the serving secondary node may be (made) aware of whether or not the master node has connectivity, e.g. via X2 interface, with the target secondary node. In some embodiments, this may be determined using a "Neighbor Information E-UTRA" information e.g. shared between base stations, e.g. gNBs, during an Xn setup procedure. In some embodiments, it may be configured, e.g. via Operations, Administration and Maintenance (OAM), whether or not the master node has connectivity, e.g. via X2 interface, with the target secondary node.

In some embodiments, e.g. related to Non-Standalone deployments, it may not be mandatory for en-gNBs to be connected via an Xn interface. In some embodiments, variants of the principle according to the embodiments, which use inter-SN communication, e.g. direct inter-SN communication, may be applied when the target PSCells belong to en-gNBs with which the source secondary node has a direct Xn connection.

In some embodiments, an autonomous inter-gNB conditional PSCell change configuration may be delivered over SRB3, when configured to the UE. This is valid, for example, when either the target SN security key is delivered in advance to the serving SN by the MN or when the serving SN generates the target SN security key or when the SN security key change is not required during an inter-SN CPC.

Some embodiments relate to an apparatus comprising means for causing a serving secondary node to transmit to a target secondary node a preparation request indicating that an inter-secondary node conditional PSCell change is to be prepared. In some embodiments, the means for causing the serving secondary node to transmit the preparation request may e.g. comprise at least one processor, and at least one memory storing instructions, the at least one memory and the instructions configured to, with the at least one processor, perform said step(s).

Some embodiments relate to an apparatus comprising means for causing a target secondary node to receive from a serving secondary node a preparation request indicating that an inter-secondary node conditional PSCell change is to be prepared, and to transmit to the serving secondary node a preparation response. In some embodiments, the means may e.g. comprise at least one processor, and at least one memory storing instructions, the at least one memory and the instructions configured to, with the at least one processor, perform said step(s).

Some embodiments relate to an apparatus comprising means for causing a master node to perform at least one of the following steps: a) transmit to a serving secondary node first information indicating whether the serving secondary node may directly transmit a preparation request indicating that an inter-secondary node conditional PSCell change is to be prepared to a target secondary node, b) receive the preparation request from the serving secondary node and forward it to a target secondary node, c) receive a preparation response from the target secondary node and forward it to the serving secondary node. In some embodiments, the means may e.g. comprise at least one processor, and at least one memory storing instructions, the at least one memory and the instructions configured to, with the at least one processor, perform said step(s).

Some embodiments relate to a wireless communications system comprising at least one serving secondary node and at least one apparatus according to the embodiments.

DESCRIPTION OF SOME EXEMPLARY EMBODIMENTS

Some embodiments relate to an apparatus, e.g. for a base station, e.g. gNB, e.g. (at least temporarily acting as) serving secondary node 11 (FIG. 2) of a wireless communications system 10.

Figure 1A:
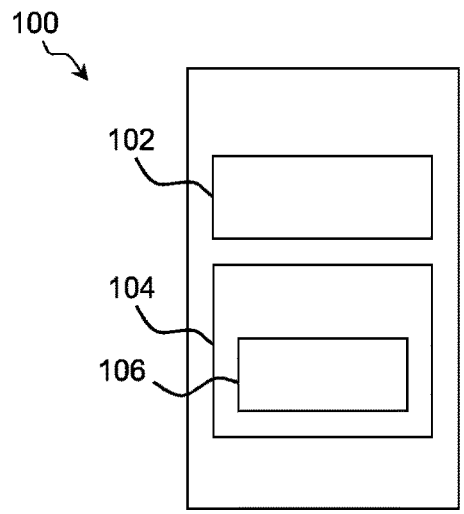
FIG. 1A schematically depicts a simplified block diagram of an apparatus according to some embodiments, FIG. 1B schematically depicts a simplified block diagram of apparatus according to some embodiments, FIG. 2 schematically depicts a simplified block diagram according to some embodiments, FIG. 3 schematically depicts a simplified flow chart according to some embodiments, FIG. 4 schematically depicts a simplified flow chart according to some embodiments, FIG. 5 schematically depicts a simplified flow chart according to some embodiments, FIG. 6 schematically depicts a simplified diagram of a scenario according to some embodiments, FIG. 7 schematically depicts a simplified flow chart according to some embodiments, FIG. 8 schematically depicts a simplified flow chart according to some embodiments, and FIG. 9 schematically depicts a simplified block diagram according to some embodiments.
Figure 3:
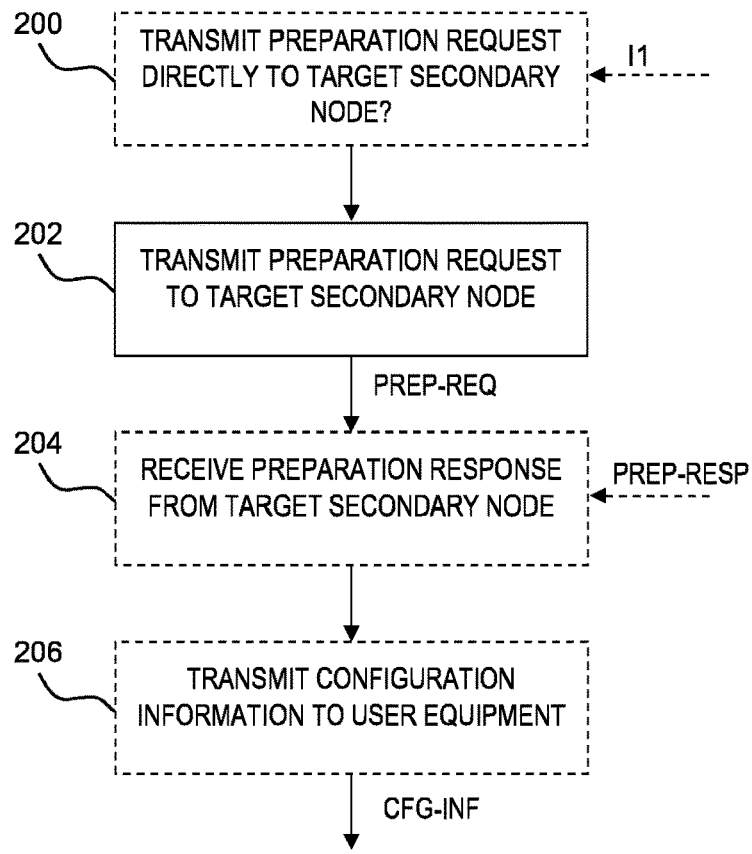

FIG. 1A schematically depicts a simplified block diagram of the apparatus 100 according to some embodiments, and FIG. 3 schematically depicts a simplified flow chart of a method of operating the apparatus 100 according to some embodiments.

The apparatus 100 comprises at least one processor 102, and at least one memory 104 storing instructions 106, the at least one memory 104 and the instructions 106 configured to, with the at least one processor 102, cause a serving secondary node 11 (FIG. 2) to transmit 202 (FIG. 3) to a target secondary node 12 a preparation request PREP-REQ indicating that an inter-secondary node conditional PSCell (primary cell of a secondary cell group, SCG) change is to be prepared. The transmission 202 of the preparation request PREP-REQ and/or further data exchange (receipt, transmission) between the serving secondary node 11 and the target secondary node 12 is symbolized with a block arrow A1 in FIG. 2.

In some embodiments, the apparatus 100 (FIG. 1) may be an apparatus for a wireless communications system 10.

In some embodiments, the apparatus 100 or its functionality, respectively, may be provided for and/or in a network element 11 (FIG. 2) of the communications system, for example in a base station 11, e.g. a gNodeB (gNB) 11, wherein the gNB 11 may e.g. at least temporarily be operated as a serving secondary node 11.

In some embodiments, the apparatus 100 according to the embodiments or its functionality, respectively, may be used for or within wireless communications systems 10, e.g. networks, based on or at least partially adhering to third generation partnership project, 3GPP, radio standards such as 5G (fifth generation) or other radio access technology.

In some embodiments, the apparatus 100 according to the embodiments may be used with terminal 14 (FIG. 2) devices capable of Multi-Radio Dual Connectivity (MR-DC), e.g. Dual Connectivity between E-UTRA (Evolved Universal Terrestrial Radio Access) and (5G) NR (New Radio) nodes, or between two NR nodes, e.g. EN-DC and/or NR-DC.

Regarding MR-DC with EPC, E-UTRAN supports MR-DC via E-UTRA-NR Dual Connectivity (EN-DC), in which a user equipment (UE) 14 may be connected to one eNB (eNodeB) 13 that acts as a master node (MN) and to one en-gNB 11 that acts as a secondary node (SN) 11, e.g. serving secondary node 11.

In some embodiments, the apparatus 100 according to the embodiments may be used for preparing a conditional PSCell change, CPC, e.g. inter-SN CPC, e.g. for preparing a PSCell belonging to a neighbor gNB, wherein e.g. a user equipment 14 performs a PSCell change when a predetermined condition is met for a specific target PSCell.

Figure 6:
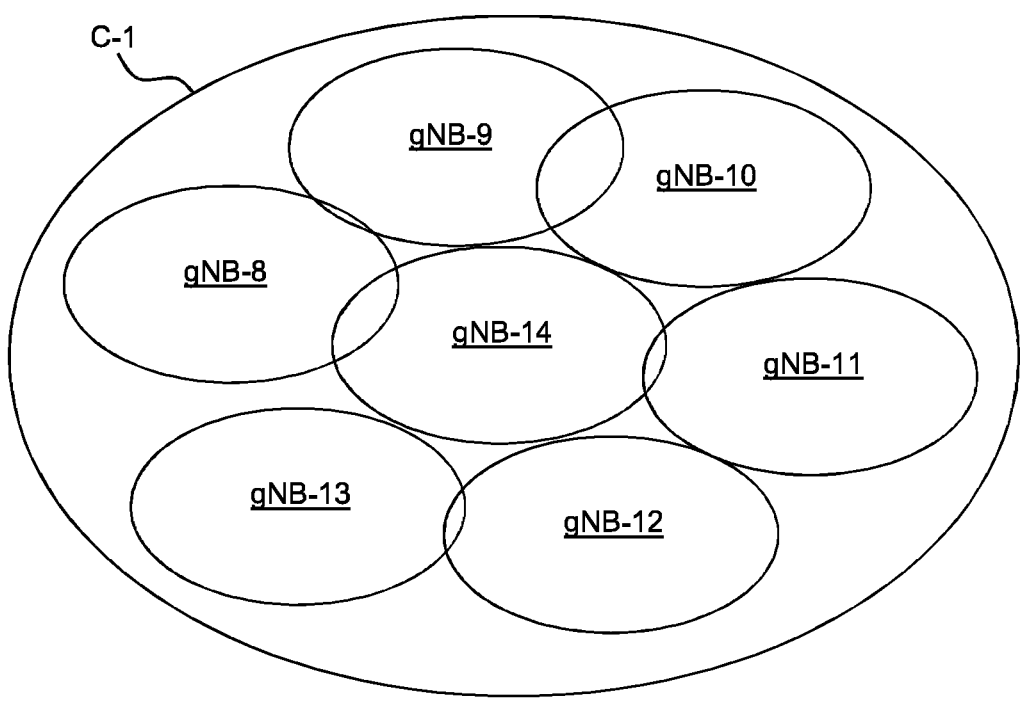

In this regard, FIG. 6 exemplarily depicts a simplified diagram of a scenario according to some embodiments. More specifically, FIG. 6 exemplarily shows a deployment scenario for MR-DC where there are multiple gNBs gNB-8, gNB-9, . . . , gNB-14, e.g. in an area served by a single eNB, wherein reference sign C 1 exemplarily denotes a radio cell of the eNB. In the present scenario, a macro LTE eNB cell is associated with the master node 13 (FIG. 2), and several, e.g. cmW (centimeter wave)-based, en-gNB cells may be provided by the gNBs gNB-8, gNB-9, . . . , gNB-14, which are e.g. secondary nodes (SN), e.g. according to an exemplary EN-DC deployment. The significance of the exemplary deployment is to illustrate the fact that there may be scenarios in deployments when there is change in PSCell (SN) for a UE, but the PCell (MN) remains unchanged.

As an example, in some embodiments, the eNB cell C_1 may have an inter-site distance (ISD) of e.g. 1 km, whereas the en-gNB cells may e.g. have an ISD of e.g. 200-300 m.

In some embodiments, the exemplary deployment according to FIG. 6 has the following observations.

a) A UE 14 (FIG. 2) may undergo PSCell change without changing its PCell (Primary Cell).
b) A UE 14 may retain the same eNB (e.g., cell C_1), while changing its gNB,
c) The PSCell may belong to a different gNB (SN) than the current one,
d) In cases where the master node 13 is not impacted, according to some embodiments, a signaling radio bearer (SRB), e.g. SRB3 (direct SRB between SN 11 and UE 14) may be used to perform PSCell change (i.e., to deliver a Reconfiguration message).

Some exemplary embodiments address one or more of the following aspects: Providing a standardized and/or optimized way for a secondary node 11 to prepare a PSCell, e.g. belonging to a different gNB (potential SN), e.g. for inter-SN (gNB) CPC.

While FIG. 6 exemplarily depicts an EN-DC setting, the principle according to the embodiments is also applicable to further MR-DC and NR-DC variants, e.g. NE-DC, NG-ENDC, NR-DC etc.

In some embodiments, the instructions 106 (FIG. 1), when executed by the at least one processor 102, cause the serving secondary node 11 (FIG. 2) to receive 204 (FIG. 3) a preparation response PREP-RESP from the target secondary node 12, e.g. based on and/or in response to the preparation request PREP-REQ.

In some embodiments, the preparation response PREP-RESP may comprise one or more (conditional) reconfigurations associated with one or more potential target PSCells, which potential target PSCells are e.g. controlled by the target secondary node 12.

In some embodiments, the instructions 106, when executed by the at least one processor 102, cause the serving secondary node 11 to at least temporarily directly transmit 202 the preparation request PREP-REQ to the target secondary node 12 and/or to directly receive 204 the preparation response PREP-RESP from the target secondary node 12, e.g. via a direct signaling connection A1 (FIG. 2) between the serving secondary node 11 and the target secondary node 12.

In some embodiments, the direct data connection A1 between the serving secondary node 11 and the target secondary node 12 may comprise an Xn interface A1.

In some embodiments, the instructions 106, when executed by the at least one processor 102, cause the serving secondary node 11 to at least temporarily transmit 202 the preparation request PREP-REQ to the target secondary node 12 via a master node 13, e.g. of the MR-DC, e.g. EN-DC, and/or to receive 204 the preparation response PREP-RESP from the target secondary node 12 via the master node 13.

In other words, in some embodiments, the preparation request PRE-REQ and/or the preparation response PREP-RESP are at least temporarily transmitted via the master node 13, e.g. from the serving secondary node 11 to the master node 13 (cf. e.g. the arrow A2 of FIG. 2), and from the master node 13 to the target secondary node 12 (e.g., for the preparation request), and/or from the target secondary node 12 to the master node 13 (cf. e.g. the arrow A3 of FIG. 2), and from the master node 13 to the serving secondary node 11 (e.g., for the preparation response).

In some embodiments, the instructions 106, when executed by the at least one processor 102, cause the serving secondary node 11 to determine 200 (FIG. 3), whether the serving secondary node 11 may directly transmit the preparation request PREP-REQ to the target secondary node 12, e.g. via the Xn interface A1, as exemplarily mentioned above. As an example, in some embodiments, such information may be signaled by another device, e.g. the master node 13, to the serving secondary node 11.

In some embodiments, the instructions 106, when executed by the at least one processor 102, cause the serving secondary node 11 to receive 200 a first information I1 from the master node 13, the first information I1 indicating whether the serving secondary node 11 may directly transmit the preparation request PREP-REQ to the target secondary node 12, e.g. via the Xn interface A1.

In some embodiments, based on the first information I1, the serving secondary node 11 may determine, also see step 200 of FIG. 3, whether it may directly transmit the preparation request to the target secondary node 12, e.g. via the Xn interface A1.

However, in some embodiments, wherein e.g. the master node 13 signals to the serving secondary node 11 that the serving secondary node 11 may not transmit the preparation request PREP-REQ to the target secondary node 12 directly, the serving secondary node 11 may e.g. act accordingly, e.g. by transmitting 202 the preparation request PREP-REQ via the master node 13, as also exemplarily disclosed above.

In other words, in some embodiments, the master node 13 may signal to the serving secondary node 11, e.g. using the first information I1, if the master node 13 agrees for the serving secondary node 11 to prepare the inter-SN neighbors directly, e.g. via directly transmitting 202 one or more preparation requests PREP-REQ to the one or more target secondary nodes 12.

In some embodiments, the preparation request PREP-REQ may also be denoted as "Inter-SN PSCell Preparation Request". In some embodiments, the preparation response PREP-RESP may also be denoted as "Inter-SN PSCell Preparation Response".

In some embodiments, the serving secondary node 11 may prepare one or more PSCells, e.g. by transmitting 202 and/or routing the (Inter-SN PSCell) preparation request PREP-REQ via the master node 13 ("indirect" variant) or directly ("direct" variant), e.g. over Xn A1.

In some embodiments, e.g. if a target secondary node 12 has multiple PSCells, a single (Inter-SN PSCell) preparation request PREP-REQ may be used to prepare a plurality, e.g. all, of the PSCells, e.g. simultaneously.

In some embodiments, e.g. if different PSCells belong to different target secondary nodes 12 (only one target secondary node 12 depicted for clarity), respective different preparation requests have to be used. In these cases, too, at least some of the different preparation requests may e.g. be transmitted directly to respective first target secondary nodes, e.g. via an Xn interface, and at least some further ones of the different preparation requests may e.g. be transmitted to respective second target secondary nodes via the master node 13.

In some embodiments, e.g. for transmitting the preparation request via the master node 13 and/or for receiving the preparation response via the master node 13, a data container, e.g. "transparent" data container may be used.

In some embodiments, the data container is not decoded by the master node 13, but e.g. rather merely forwarded to the intended receiver, e.g. at least one target secondary node 12 in case of the preparation request and/or the serving secondary node 11 in case of the preparation response.

In some embodiments, the instructions 106, when executed by the at least one processor 102, cause the serving secondary node 11 to transmit 206 configuration information CFG-INF related to the inter-secondary node conditional PSCell change to a user equipment 14 (FIG. 2), e.g. upon receipt 204 of a corresponding preparation response PREP-RESP.

In some embodiments, the configuration information CFG-INF may comprise reconfigurations associated with a respective PSCell, which e.g. enable the user equipment 14 to perform the conditional PSCell change, e.g. once the corresponding criteria are satisfied.

In some embodiments, a radio resource control, RRC, Reconfiguration message may be used for transmitting 206 the configuration information CFG-INF related to the inter-secondary node conditional PSCell change to the user equipment 14.

Figure 2:
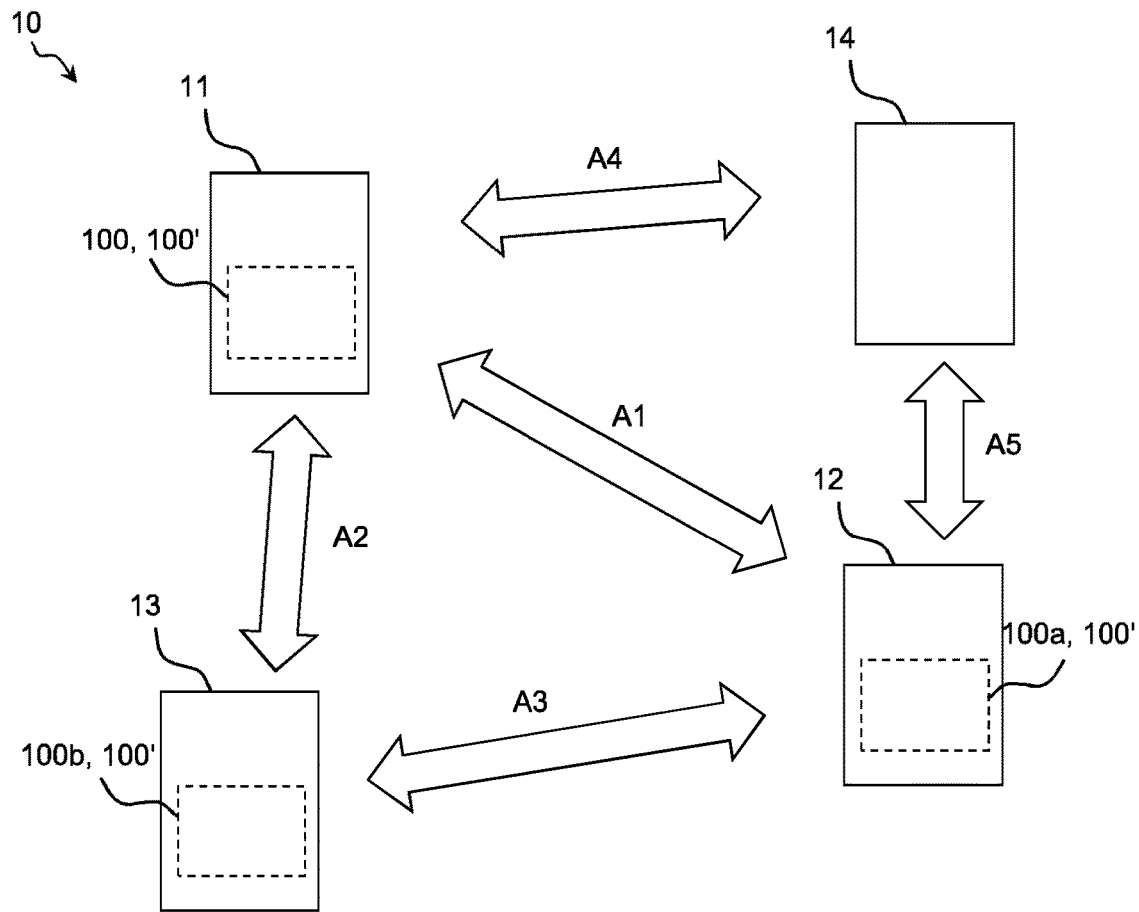

In some embodiments, the configuration information CFG-INF may be transmitted to the user equipment 14 via a signaling radio bearer (SRB), e.g. SRB3, e.g. without involvement of the master node 13, see for example arrow A4 of FIG. 2. In some embodiments, this is valid, for example, when either the target SN security key is delivered in advance to the serving SN by the MN or when the serving SN generates the target SN security key or when the SN security key change is not required during an inter-SN CPC.

Figure 1B:
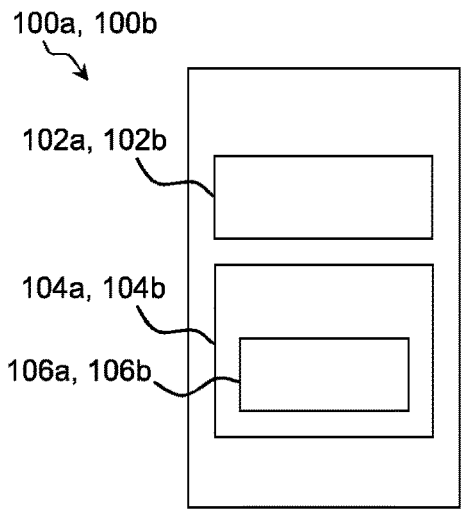
Figure 4:
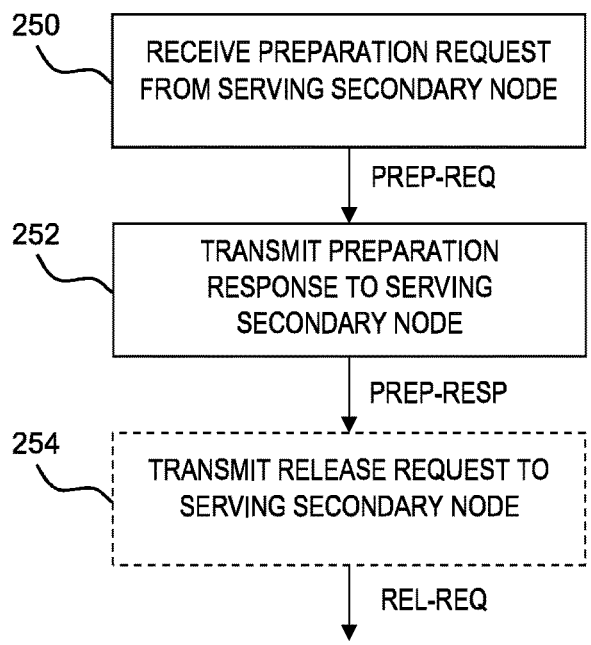

Some embodiments, FIG. 1B, relate to an apparatus 100a, e.g. for an gNB, e.g. (at least temporarily acting as) a target secondary node 12, comprising at least one processor 102a, and at least one memory 104a storing instructions 106a, the at least one memory 104a and the instructions 106a configured to, with the at least one processor 102a, cause a target secondary node 12 to receive 250 (FIG. 4) from a serving secondary node 11 (FIG. 2) a preparation request PRE-REQ indicating that an inter-secondary node conditional PSCell change is to be prepared, and to transmit 252 (FIG. 4) to the serving secondary node 11 a preparation response PREP-RESP.

In some embodiments, the target secondary node 12 may directly receive the preparation request PREP-REQ from a serving secondary node 11, e.g. via an Xn interface A1.

In some embodiments, the target secondary node 12 may directly transmit the preparation response to the serving secondary node, e.g. via the Xn interface A1.

In some embodiments, the target secondary node 12 may receive the preparation request PREP-REQ from a serving secondary node 11 via the master node 13, wherein e.g. the master node 13 forwards the preparation request as received from the serving secondary node, e.g. in the form of a ("transparent") data container, which e.g. is not decoded by the master node 13.

In some embodiments, the target secondary node 12 may transmit the preparation response PREP-RESP to the serving secondary node 11 via the master node 13, wherein e.g. the master node 13 forwards the preparation response as received from the target secondary node 12, e.g. in the form of a ("transparent") data container, which e.g. is not decoded by the master node 13.

In some embodiments, the instructions 106a, when executed by the at least one processor 102a, cause the target secondary node 12 to transmit 254 a release request REL-REQ to the serving secondary node 11, e.g. after a random access channel (RACH) procedure of a user equipment 14 with the target secondary node 12.

Some embodiments, FIG. 1B, relate to an apparatus 100b, e.g. for a base station, e.g. gNB, e.g. (at least temporarily acting as) a master node 13, comprising at least one processor 102b, and at least one memory 104b storing instructions 106b, the at least one memory 104b and the instructions 106b configured to, with the at least one processor 102b, cause a master node 13 (FIG. 2) to transmit 270 (FIG. 5) to a serving secondary node 11 first information I1 indicating whether the serving secondary node 11 may directly transmit a preparation request PREP-REQ indicating that an inter-secondary node conditional PSCell change is to be prepared to a target secondary node 11.

In some embodiments, the first information I1 may be transmitted from the master node 13 to the serving secondary node 11 using an X2 interface, see for example the arrow A2 of FIG. 2. In some embodiments, the first information I1 may e.g. be included in at least one message, e.g. associated with a secondary node addition procedure.

In some embodiments, the first information I1 may e.g. be represented by a flag, e.g. a bit flag, e.g. comprising a single bit.

Some embodiments relate to an apparatus 100b, comprising at least one processor 102b, and at least one memory 104b storing instructions 106b, the at least one memory 104b and the instructions 106b configured to, with the at least one processor 102b, cause a master node 13 to receive 272 (FIG. 5) the preparation request PREP-REQ from the serving secondary node 11 and forward it to a target secondary node 12, wherein the preparation request may e.g. comprise the form of a ("transparent") data container, or may be arranged in such data container.

In some embodiments, the preparation request PRE-REQ and/or the data container comprising the preparation request PRE-REQ is not decoded by the master node 13. Instead, in some embodiments, the preparation request PRE-REQ and/or the data container comprising the preparation request PRE-REQ may be forwarded by the master node 13, e.g. without decoding by the master node 13.

Some embodiments relate to an apparatus 100b, comprising at least one processor 102b, and at least one memory 104b storing instructions 106b, the at least one memory 104b and the instructions 106b configured to, with the at least one processor 102b, cause a master node 13 to receive 274 (FIG. 5) the preparation response PREP-RESP from the target secondary node 12 and forward it to the serving secondary node 11, wherein the preparation response PREP-RESP may e.g. comprise the form of a ("transparent") data container, or may be arranged in such data container.

In some embodiments, the preparation response and/or the data container comprising the preparation response is not decoded by the master node 13. Instead, in some embodiments, the preparation response and/or the data container comprising the preparation response may be forwarded by the master node 13, e.g. without decoding by the master node 13.

Some embodiments relate to a method comprising: transmitting 202 (FIG. 3), by a serving secondary node 11, to a target secondary node 12 a preparation request PRE REQ indicating that an inter-secondary node conditional PSCell change is to be prepared.

Further exemplary embodiments of the method relate to method aspects 200, 204, 206, etc. that have exemplarily been explained above with respect to the serving secondary node 11.

Some embodiments relate to a method comprising: receiving 250 (FIG. 4), by a target secondary node 12, from a serving secondary node 11 a preparation request PRE-REQ indicating that an inter-secondary node conditional PSCell change is to be prepared, and transmitting 252, by the target secondary node 12, to the serving secondary node 11 a preparation response PREP-RESP.

Further exemplary embodiments of the method relate to method aspects 254, etc. that have exemplarily been explained above with respect to the target secondary node 12.

Figure 5:
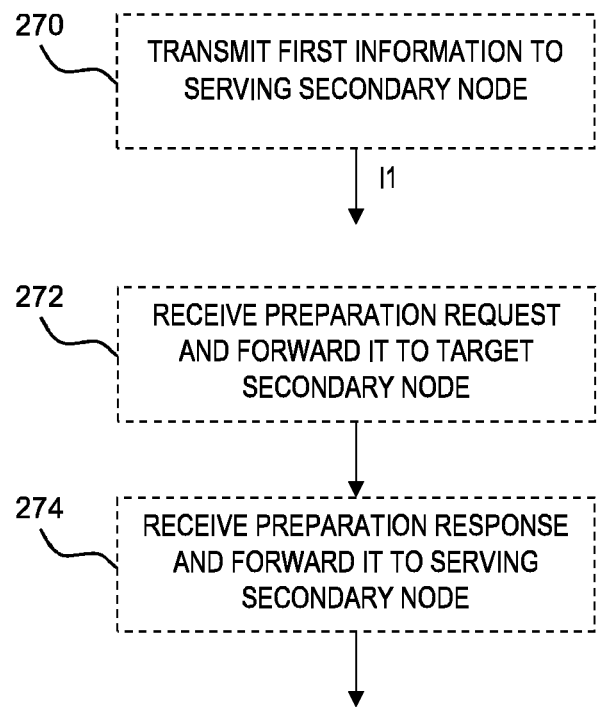

Some embodiments, FIG. 5, relate to a method comprising at least one of the following steps: a) transmitting 270, by a master node 13, to a serving secondary node 11 first information I1 indicating whether the serving secondary node 11 may directly transmit a preparation request PREP-REQ indicating that an inter-secondary node conditional PSCell change is to be prepared to a target secondary node 12, b) receiving 272, by the master node 13, the preparation request PREP-REQ from the serving secondary node 11, and forwarding it to a target secondary node 12, c) receiving 274, by the master node 13, the preparation response PREP-RESP from the target secondary node 12 and forwarding it to the serving secondary node 11.

Further exemplary embodiments of the method relate to method aspects that have exemplarily been explained above with respect to the master node 13.

Figure 7:
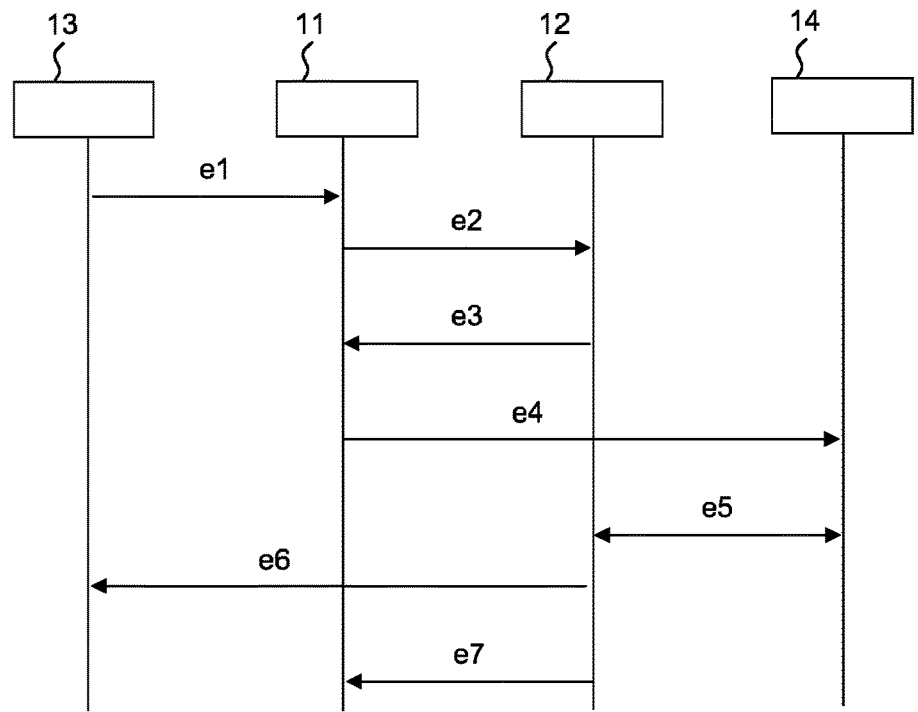

FIG. 7 schematically depicts a simplified flow chart according to some embodiments, wherein the elements 11, 12, 13, 14 of FIG. 7 correspond with the elements 11, 12, 13, 14 of FIG. 2 explained above.

Element e1 symbolizes a transmission of a bit flag characterizing the first information I1. Element e2 symbolizes a transmission of the preparation request, e.g. "Inter-SN PSCell Preparation Request", wherein presently a direct transmission from the serving secondary node 11 to the target secondary node 12, e.g. via an Xn interface, is used.

Element e3 symbolizes a transmission of the preparation response, e.g. "Inter-SN PSCell Preparation Response", wherein presently a direct transmission from the target secondary node 12 to the serving secondary node 11, e.g. via the Xn interface, is used.

Element e4 symbolizes a transmission of configuration information CFG-INF (see for example block 206 of FIG. 3), e.g. using a radio resource control, RRC, Reconfiguration message, e.g. using SRB3, and element e5 symbolizes a RACH procedure as performed by the user equipment 14 with respect to the target secondary node 12, also see for example the arrow A5 of FIG. 2.

Element e6 symbolizes the target secondary node 12 notifying the master node 13 about the access e5 of the user equipment 14, e.g. using an "UE Access Notification" message.

Element e7 symbolizes the target secondary node 12 transmitting a release request, e.g. an SgNB (secondary gNB) Release request, to the serving, e.g. source, secondary node 11.

Figure 8:
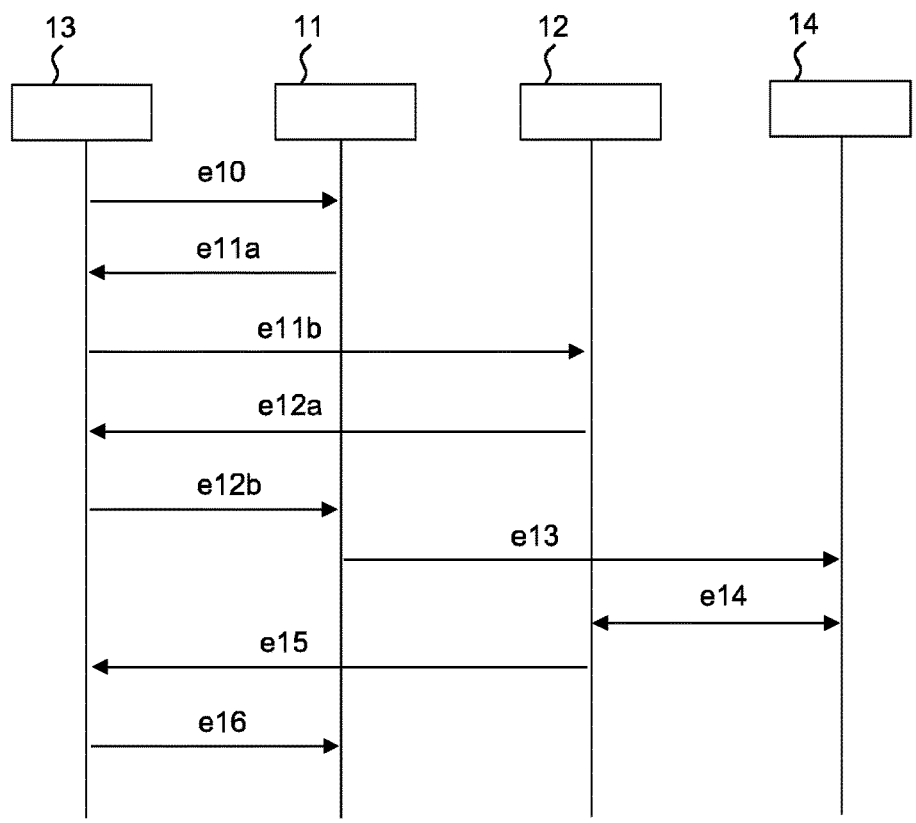

FIG. 8 schematically depicts a simplified flow chart according to some embodiments.

Element e10 symbolizes a secondary node addition procedure. Elements e11a, e11b symbolize a transmission of the preparation request, e.g. "Inter-SN PSCell Preparation Request", wherein presently the "Inter-SN PSCell Preparation Request" is transmitted via the master node 13 to the target secondary node 12, e.g. "indirectly", and not directly as e.g. symbolized by element e2 of FIG. 7.

Elements e12a, e12b symbolize a transmission of the preparation response, e.g. "Inter-SN PSCell Preparation Response", wherein presently the "Inter-SN PSCell Preparation Response" is transmitted via the master node 13 to the serving secondary node 11, e.g. "indirectly", and not directly as e.g. symbolized by element e3 of FIG. 7.

Element e13 symbolizes a transmission of configuration information CFG-INF (see for example block 206 of FIG. 3), e.g. similar to element e4 of FIG. 7, e.g. using a radio resource control, RRC, Reconfiguration message, e.g. using SRB3, and element e14 of FIG. 8 symbolizes a RACH procedure as performed by the user equipment 14 with respect to the target secondary node 12.

Element e15 symbolizes the target secondary node 12 notifying the master node 13 about the access e14 of the user equipment 14, e.g. using an "UE Access Notification" message, e.g. similar to element e6 of FIG. 7.

Element e16 of FIG. 8 symbolizes the master node 13 transmitting a release request, e.g. an SgNB Release request, to the serving, e.g. source, secondary node 11.

In some embodiments, the serving secondary node 11 may be (made) aware of whether or not the master node 13 has connectivity, e.g. via X2 interface, with the target secondary node 12. In some embodiments, this may be determined using a "Neighbor Information E-UTRA" information e.g. shared between base stations, e.g. gNBs, during an Xn setup procedure. In some embodiments, it may be configured, e.g. via Operations, Administration and Maintenance (OAM), whether or not the master node 13 has connectivity, e.g. via X2 interface, with the target secondary node 12.

In some embodiments, e.g. related to Non-Standalone (NSA) deployments, it may not be mandatory for en-gNBs to be connected via an Xn interface. In some embodiments, variants of the principle according to the embodiments, which use inter-SN communication, e.g. direct inter-SN communication, may be applied when the target PSCells belong to en-gNBs with which the source secondary node 11 has a direct Xn connection.

Figure 9:
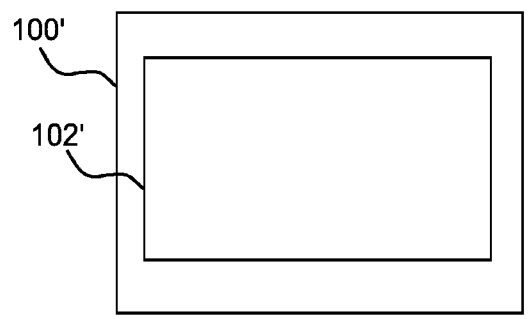

Some embodiments, FIG. 9, relate to an apparatus 100' comprising means 102' for causing a serving secondary node 11 to transmit to a target secondary node 12 a preparation request PREP-REQ indicating that an inter-secondary node conditional PSCell change is to be prepared. In some embodiments, the means 102' for causing the serving secondary node to transmit the preparation request may e.g. comprise at least one processor, and at least one memory storing instructions, the at least one memory and the instructions configured to, with the at least one processor, perform said step(s).

Some embodiments relate to an apparatus 100' comprising means 102' for causing a target secondary node 12 to receive from a serving secondary node 11 a preparation request indicating that an inter-secondary node conditional PSCell change is to be prepared, and to transmit to the serving secondary node a preparation response. In some embodiments, the means 102' may e.g. comprise at least one processor, and at least one memory storing instructions, the at least one memory and the instructions configured to, with the at least one processor, perform said step(s).

Some embodiments relate to an apparatus 100' comprising means 102' for causing a master node 13 to perform at least one of the following steps: a) transmit to a serving secondary node 11 first information indicating whether the serving secondary node 11 may directly transmit a preparation request indicating that an inter-secondary node conditional PSCell change is to be prepared to a target secondary node 12, b) receive the preparation request from the serving secondary node 11 and forward it to a target secondary node 12, c) receive a preparation response from the target secondary node 12 and forward it to the serving secondary node 11. In some embodiments, the means 102' may e.g. comprise at least one processor, and at least one memory storing instructions, the at least one memory and the instructions configured to, with the at least one processor, perform said step(s).

Some embodiments relate to a wireless communications system 10 (FIG. 2) comprising at least one serving secondary node 11 and at least one apparatus 100, 100a, 100b, 100' according to the embodiments.

In some embodiments, see for example FIG. 8, it is, e.g. entirely, the responsibility of the serving SN 11 to prepare the inter-SN PSCells, see elements e11a, e11b, e12a, e12b, just that the preparation messages e11a, e11b, e12a, e12b are "routed", e.g. transmitted, via the master node 13.

At least some embodiments enable to make an inter-SN CPC change transparent to the master node 13, e.g. without involvement of the master node 13, which is not possible with some conventional approaches.

In some embodiments, regarding a delivery of a CPC command, it is proposed to use e.g. the SRB3 for delivering an inter-SN PSCell preparation command to the UE 14. In some embodiments, in inter-SN CPC without master node involvement, the CPC command may e.g. be sent via SRB3 or SRB1. Herein, e.g. without the involvement of the master node 13, the master node 13 is not aware of the CPC, although the CPC command may be routed via the SRB1 of the master node 13 (in some embodiments, the CPC may e.g. be sent in a transparent way using an MN radio link). In some embodiments, this is valid, for example, when either the target SN security key is delivered in advance to the serving SN by the MN or when the serving SN generates the target SN security key or when the SN security key change is not required during an inter-SN CPC.

In some embodiments, one of more of the following aspects may be provided related to Post Preparation procedures:

Once the UE 14 is prepared for an inter-SN PSCell change, in some embodiments, there could be an execution of a PSCell change in the UE 14 which may bring about certain additional aspects:

a) Path Switch procedure to be executed by the master node 13 towards the UPF (user plane function). Once the UE 14 performs RACH at the new serving SN 12, the new serving SN 12 may send a UE access notification e6, e15 to the serving master node 13. In some embodiments, this UE access notification e6, e15 may act as a trigger for the master node 13 to initiate a path switch towards the UPF. In other words, in some embodiments, the master node 13 may initiate a path switch towards the UPF, e.g. after receiving the UE access notification e6, e15. In some embodiments, this is applicable only for SN terminated and SN-terminated split bearers. In some embodiments, for MN terminated split bearers, the MN 13 may update the new SN TEIDs (Tunnel Endpoint Identifiers).

b) Security key changes at the new serving SN 12: In some embodiments, there are a couple of alternatives here. b1)

In some embodiments, the MN 13 may forward, e.g. beforehand, the security keys of a target, e.g. neighboring, SN 12 to the source SN 11 using e.g. an SN Addition procedure, e.g. along with the (bit) flag that it can trigger inter-SN without MN involvement (e.g., the first information 11). In some embodiments, the source SN 11 may then forward the security keys that shall be used by the target SN 12 during the PSCell preparation. b2) Alternatively, in some embodiments, the MN 13 may forward to the target SN 11 the security keys that shall be applied after the CPC execution is performed. This is e.g. in response to the UE access notification message e6, e15 sent by the new serving SN 12. In this case, in some embodiments, the serving SN may use its own keys while preparing the inter-SN PSCell CPC. This also means that in some embodiments the target SN may re-use the source SN security keys for decoding the RRC Connection reconfiguration complete sent by the UE. Subsequently, new keys provided by the MN could be used for further transactions.

At least some exemplary embodiments may at least temporarily attain one or more of the following advantages:

The SN 11 does not need to contact the source MN 13 for initiating inter-SN change, i.e., a "SgNB Change Required" message of some conventional approaches is not needed.

The signaling and latency may be improved with direct communication e2, e3, e.g. compared to conventional approaches where e.g. each PSCell needs a separate SN Change procedure.

The invention claimed is:

1. A serving secondary node, comprising:
   at least one processor; and
   at least one memory storing instructions, which, when executed by the at least one processor, cause the serving secondary node to:
   receive, from a master node, first information indicating whether the serving secondary node is permitted to directly transmit a preparation request (PREP-REQ) to a target secondary node, wherein the preparation request indicates that an inter-secondary node conditional primary cell of a secondary cell group (PSCell) change is to be prepared;
   determine, based on the first information, that the serving secondary node is permitted to directly transmit the preparation request to the target secondary node;
   directly transmit, to the target secondary node, the preparation request;
   directly receive, from the target secondary node, a preparation response via a signaling connection between the serving secondary node and the target secondary node; and
   transmit, to a user equipment, configuration information (CFG-INF) related to the inter-secondary node conditional PSCell change over a signaling radio bearer using a radio interface of the serving secondary node.

2. The serving secondary node according to claim 1, wherein the preparation request requests preparation of a plurality of conditional PSCells, wherein the plurality of conditional PSCells include a conditional PSCell, and wherein each of the plurality of conditional PSCells is controlled by the target secondary node.

3. The serving secondary node according to claim 1, wherein the preparation request includes security keys for the user equipment, and wherein the security keys are received by the serving secondary node from the master node.

4. The serving secondary node according to claim 1, wherein the preparation request comprises at least one of:
   a target PSCell identifier indicating one or more conditional PSCells to be prepared by the target secondary node; and
   security keys for use by the target secondary node for communication with the user equipment after the conditional PSCell change is executed.

5. The serving secondary node according to claim 1, wherein the configuration information (CFG-INF) comprises:
   a radio resource configuration for at least one target PSCell of the target secondary node; and
   one or more conditions for the user equipment to execute the conditional PSCell change.

6. The serving secondary node according to claim 1, wherein the configuration information (CFG-INF) is transmitted in response to the serving secondary node receiving the preparation response from the target secondary node.

7. The serving secondary node according to claim 1, wherein the configuration information is transmitted within a Radio Resource Control (RRC) Reconfiguration message.

8. The serving secondary node according to claim 5, wherein the one or more conditions are based on one or more measurements performed by the user equipment on a cell of the target secondary node.

* * * * *